United States Patent [19]

Nagashima

[11] Patent Number: 5,029,161
[45] Date of Patent: Jul. 2, 1991

[54] MAINTENANCE SYSTEM FOR SUBSCRIBER TERMINAL MANAGEMENT DATA IN A PACKET SWITCHED NETWORK

[75] Inventor: Yoshiaki Nagashima, Hyogo, Japan

[73] Assignee: Mitsubishi Denki Kabushiki Kaisha, Tokyo, Japan

[21] Appl. No.: 379,945

[22] Filed: Jul. 14, 1989

[30] Foreign Application Priority Data

Nov. 7, 1988 [JP] Japan ................................ 63-279404

[51] Int. Cl.5 ............................................... H04J 3/26
[52] U.S. Cl. ..................................... 370/60; 370/94.1
[58] Field of Search ....................... 370/60, 60.1, 94.1, 370/94.2, 110.1; 379/93, 94

[56] References Cited

U.S. PATENT DOCUMENTS 4,656,624 4/1987 Collins et al. ........................ 370/60
4,677,609 6/1987 Piereth et al. ........................ 370/60

FOREIGN PATENT DOCUMENTS 61-234158 10/1986 Japan .

Primary Examiner—Douglas W. Olms
Assistant Examiner—Melvin Marcelo
Attorney, Agent, or Firm—Rothwell, Figg, Ernst & Kurz

[57] ABSTRACT

A maintenance system for subscriber management data in a packet switched network which is to be used when subscriber terminal management data in a packet switching exchange is changed, comprises a step in which a change information file in a data accumulating device is created based on the subscriber terminal change data; a step in which the change of the subscriber terminal management data of a specified subscriber terminal is performed without affecting the communication processes of other subscriber terminals by a multitask process on a packet switching exchange which is remote controlled based on the change information file; a step in which a subscriber accumulation data base file in the data accumulating device is updated in synchronism with the result of a remote control. In the above-mentioned maintenance system, the subscriber terminal information in a packet switched network is unitarily controlled; local data information updating on each of the packet switching exchanges is not needed; a multitask process on each of the packet switching exchanges is made possible, and subscriber terminal management data can be changed without affecting the communication processes of other subscriber terminals.

2 Claims, 7 Drawing Sheets (a)

(b)

(c)

MAINTENANCE SYSTEM FOR SUBSCRIBER TERMINAL MANAGEMENT DATA IN A PACKET SWITCHED NETWORK

BACKGROUND OF THE INVENTION

1. Field of the Invention

The present invention relates to a maintenance system for subscriber management data in a packet switched network to be used when subscriber terminal management data on a packet switching exchange are to be updated following new registrations of subscriber terminals, change of attributes, or cancellation of registrations of subscriber terminals in a packet switched network.

2. Description of the Prior Art

FIG. 1 is a block diagram showing a conventional maintenance system for subscriber terminal management data in a packet switched network. In the figure, 1a and 1b are packet switching exchanges which constitute a packet switched network; 2a and 2b are subscriber terminals incorporated in each of the packet switching exchanges 1a and 1b; 3 is a terminal line for connecting the subscriber terminals 2a and 2b to the packet switching exchanges 1a and 1b respectively; 4a and 4b are maintenance consoles connected to each of the packet switching exchanges 1a and 1b.

FIG. 3 is a block diagram showing a table configuration of subscriber information in each packet switching exchange 1a (1b). Each packet switching exchange 1a (1b) is provided with a line information table 11 which stores circuit I/F (interface) information of the equipment such as line speed or electric I/F conditions indexed by terminal line 3, and a terminal information table 12 which stores information such as the attributes of the incorporated subscriber terminal 2a (2b), or the attributes of communication services according to CCITT recommendation X. 25. When a PVC (permanent virtual circuit) service is performed there is provided a PVC information table 13 which stores connection information between each of the PVC logical channels and the subscriber terminals at the other end of a line. In that case, the same connection information is stored in the PVC information table 13 of each packet switching exchange in which subscriber terminals at the other end of the line are incorporated.

Operation will be explained in the following. In a packet switched network as mentioned in the above, when either a new subscriber terminal 2a (2b) is to be registered, an attribute of a communication service according to CCITT recommendation X. 25 of a subscriber terminal 2a (2b) is to be changed or an existing subscriber terminal 2a (2b) registration is to be cancelled, maintenance has to be performed for updating such information. On the subscriber terminal 2a of the packet switching exchange 1a, when a new registration, a change of attribute or registration cancellation is to be performed, the line information table 11 or the terminal information table 12 in a memory is changed by inputting data from the maintenance console 4a connected to the packet switching exchange 1a. When there is a change in the attributes of the PVC communication service (setting of PVC/deleting of PVC) between the subscriber terminal 2b incorporated in the packet switching exchange 1b and the subscriber terminal 2a, not only the PVC information table 13 in the packet switching exchange 1a but also the PVC information table 13 in the packet switching exchange 1b must be changed by the operation of the maintenance console 4b connected to the packet switching exchange 1b.

FIG. 2 is a block diagram showing another conventional maintenance system for subscriber terminal management data in a packet switched network. In the figure, 1a and 1b are packet switching exchanges, 2a and 2b are subscriber terminals and 3 is a terminal line. These are equivalent to those shown in FIG. 1. A component part 5 is a network control processor (hereinafter referred to as NCP) which manages the whole packet switched network, provided in a packet switched network which is formed by the packet switching exchanges 1a and 1b. Such an NCP is shown in Japanese patent application of laid-open No. 234158/86, and it is connected to the packet switched network through a trunk line as one of its nodes. A component part 6, connected to the NCP 5, is a subscriber information data base file in which the subscriber terminal management data for each of the packet switching exchanges 1a and 1b are stored, and these data are unitarily managed by the NCP 5, and 7 is an operator console into which subscriber data and the like are inputted and is connected to the NCP 5.

Operation will be explained in the following. In the case where new registrations, changes of attributes, or cancellation of registrations regarding the subscriber terminal 2a are to be performed for the packet switching exchange 1a, at first subscriber data are inputted from the operator console 7 to the NCP 5 to change the line information and the terminal information of the subscriber terminal 2a on the file 6 of the subscriber information data base. After that the updated line information and terminal information are transferred from the NCP 5 to the packet switching exchange 1a. In the packet switching exchange 1a, each of the transferred pieces of information is overwritten on an old one in the line information table 11 and the terminal information table 12. Similarly, if there is any change in an attribute of the PVC communication service between the subscriber terminal 2a and the subscriber terminal 2b in the packet switching exchange 1b, subscriber data are inputted from the operator console 7 to the NCP 5 to change the information concerning the attribute of the relevant PVC communication service on the file 6 of the subscriber information data base. After that, each of the updated attribute information data of the PVC communication service are transferred from the NCP 5 to the switching exchanges 1a and 1b. At each of the packet switching exchanges 1a and 1b, the transferred information is overwritten on the old information is the respective PVC information tables 13. Usually, the changes of the data in tables 11, 12 and 13 are performed when a certain number of changes as to the subscriber terminals are collected, or periodically (for example, once a month).

As the conventional maintenance system of operation management data in a packet switched network is constituted and managed as mentioned above, in the example shown in FIG. 1, changing information in a plurality of tables such as the line information table 11 has to be done for each of the packet switching exchanges 1a and 1b at site; this is not only troublesome for unitary management of data but also there is a problem, as seen in the example of the PVC information table 13, that when the information updated ranges over a plurality of packet switching exchanges 1a and 1b, the updating in each of these switching exchanges requires synchronization with each other. As in the case shown in FIG. 2, even when a network control processor 5 is provided in a packet switched network for a unitary management of a data base and updated line information, terminal information and PVC information are transferred from the processor to the packet switching exchanges 1a and 1b, and in order to make effective each of the tables in which updated data transferred to the packet switching exchanges are overwritten, re-starting of a system in each of the packet switching exchanges 1a and 1b is needed; therefore it has been a problem at that time that the communication services for the subscriber terminals 2a and 2b are cut off, despite the face that they have no relation to the information change being processed in the packet switching exchanges 1a and 1b.

SUMMARY OF THE INVENTION

An object of the present invention is to provide a maintenance system for subscriber terminal management data in a packet switched network, in which there is no need to perform information updating in each of the packet switching exchanges at site in maintenance work, and because of this the unitary management of data is much improved.

A further object of the present invention is to provide a maintenance system for subscriber terminal management data in a packet switched network, in which synchronized updating is not needed even when information updating ranges over a plurality of packet switching exchanges.

A still further object of the present invention is to provide a maintenance system for subscriber terminal management data in a packet switched network, in which after the updating of information, communications between subscriber terminals having no relation to the updated information are not cut off by system re-starting of the relevant packet switching exchange.

The foregoing objects, other objects and inventive features of the present invention may be understood more clearly with reference to the following detailed description of an illustrative embodiment of the invention, together with the accompanying drawings. The drawings herein are entirely for illustrative purpose and are not restrictions of the scope of the present invention.

To accomplish the above-mentioned objects, the maintenance system for subscriber terminal data in a packet switched network according to the present invention is constituted as follows: an NCP is provided in the packet switched network; the subscriber terminal management data on a packet switching exchange in the packet switched network are unitarily managed by the NCP; upon the occurrence of new registrations, changes of attributes and registration cancellations of the subscriber terminals, a change directive of the subscriber management data of the subscriber terminals and the updated data are inputted from the operation console of the NCP to a file; upon confirming the directive contents, a command is input also from the operator console, and for a designated packet switching exchange in the packet switched network, a change control of the subscriber terminal management data of a subscriber terminal which is to be changed, is performed by the NCP in a remote control mode and moreover with a multitask program configuration in the packet switching exchange, without affecting the communications of other subscriber terminals; furthermore a subscriber accumulating data base file in a data accumulating means of the NCP can be updated in synchronism with the result of the remote control change operation.

In the maintenance system for subscriber management data in a packet switched network according to the present invention, the subscriber terminal management data in each of the packet switching exchanges in the packet switched network is remotely changed by the NCP; in the controlled packet switching exchange only the change of the subscriber terminal management data of the designated subscriber terminal is performed, by a multitask process, without affecting the communication processes of other subscriber terminals; the subscriber information data base file in the data accumulating means of the NCP is updated in synchronism with the change of subscriber management data on a packet switching exchange; thus the unitary control of the subscriber terminal information in a packet switched network is performed.

DETAILED DESCRIPTION OF THE PREFERRED EMBODIMENTS

In the following, the preferred embodiments of the present invention will be explained in detail referring to the accompanying drawings.

Figure 1:
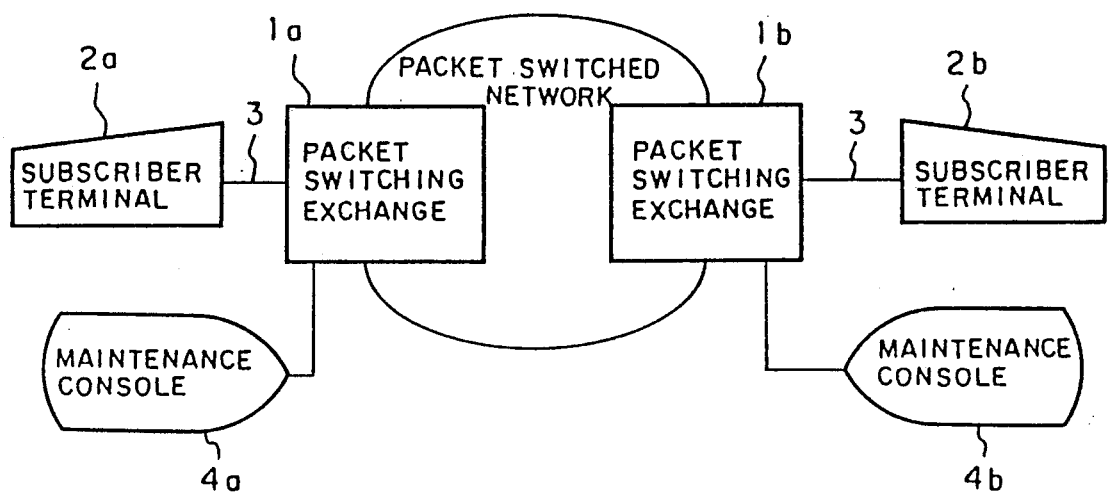
FIG. 1 and FIG. 2 are block diagrams showing a conventional maintenance system for operation management data in a packet switched network.
Figure 2:
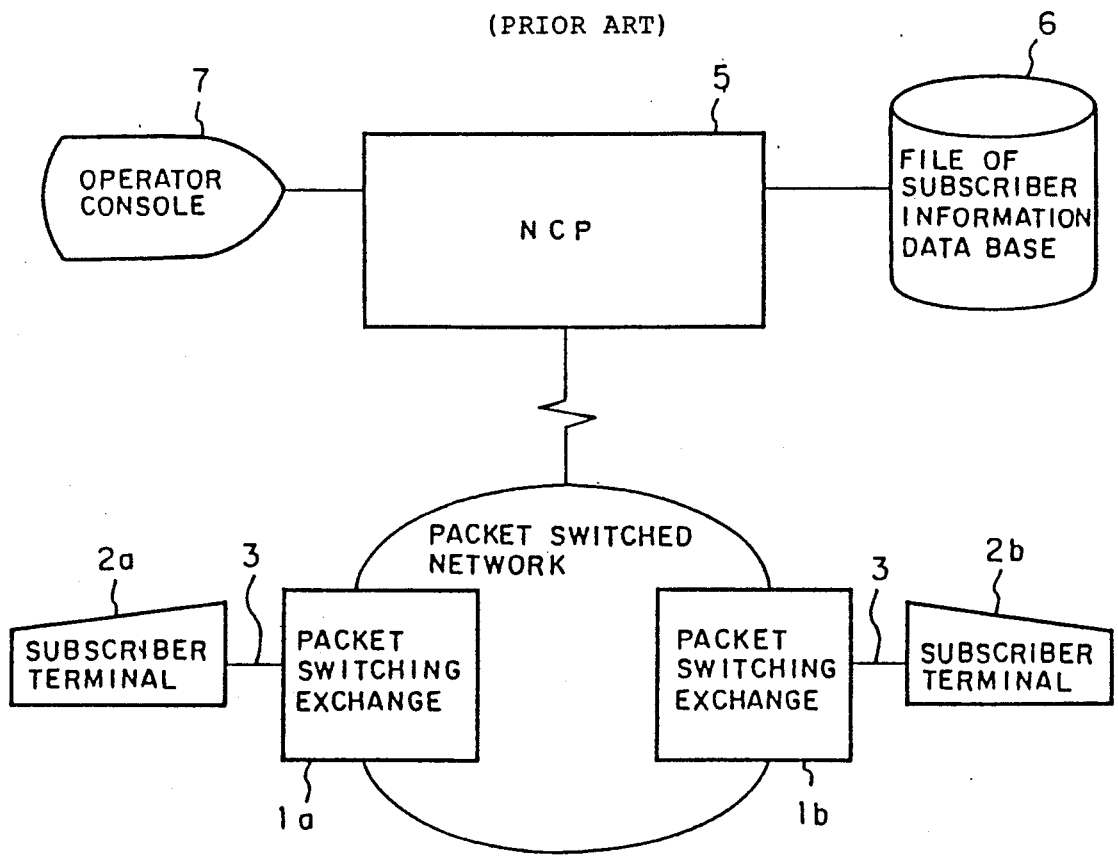
Figure 3:
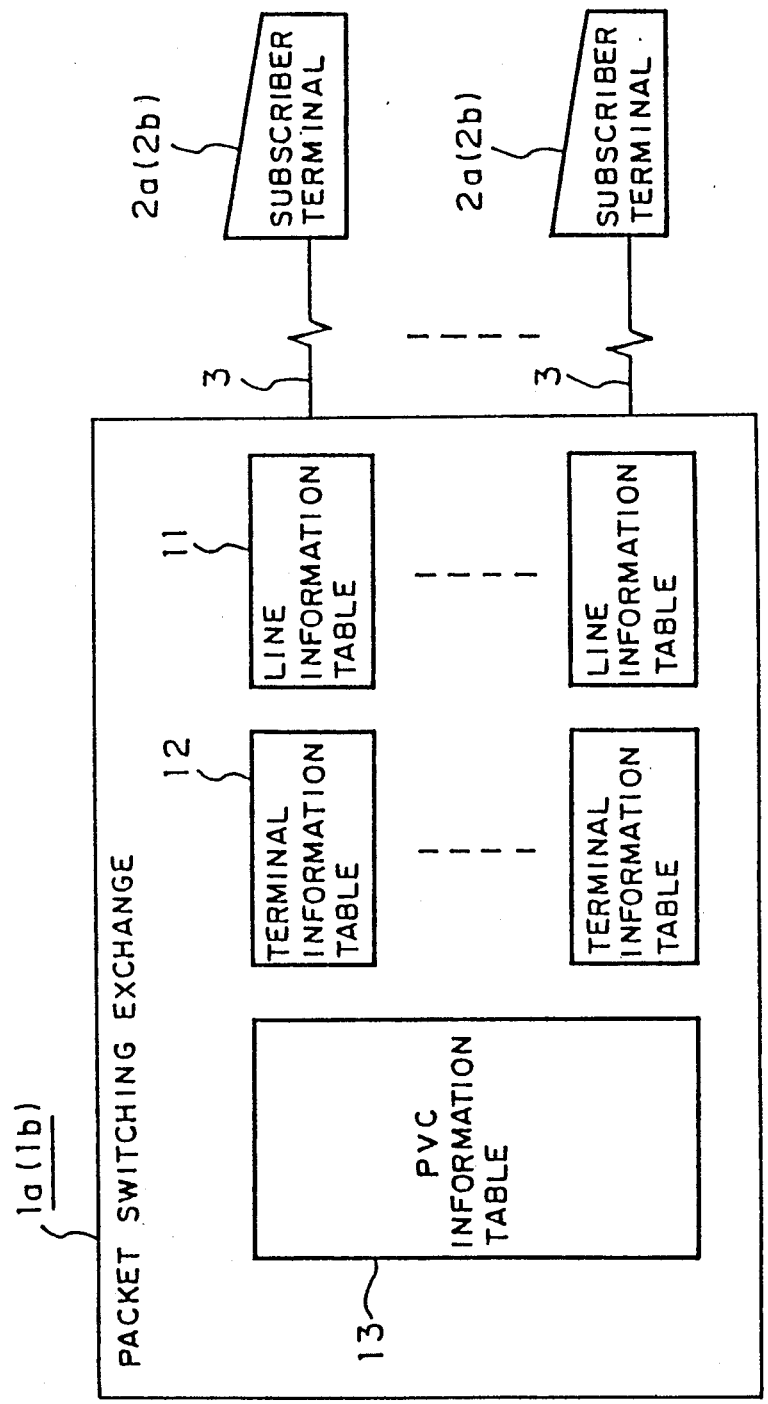
FIG. 3 is an explanatory block diagram showing the table configuration of the subscriber information in each packet switching exchange in a maintenance system in a packet switched network both according to the present invention and also to a conventional type.
Figure 4:
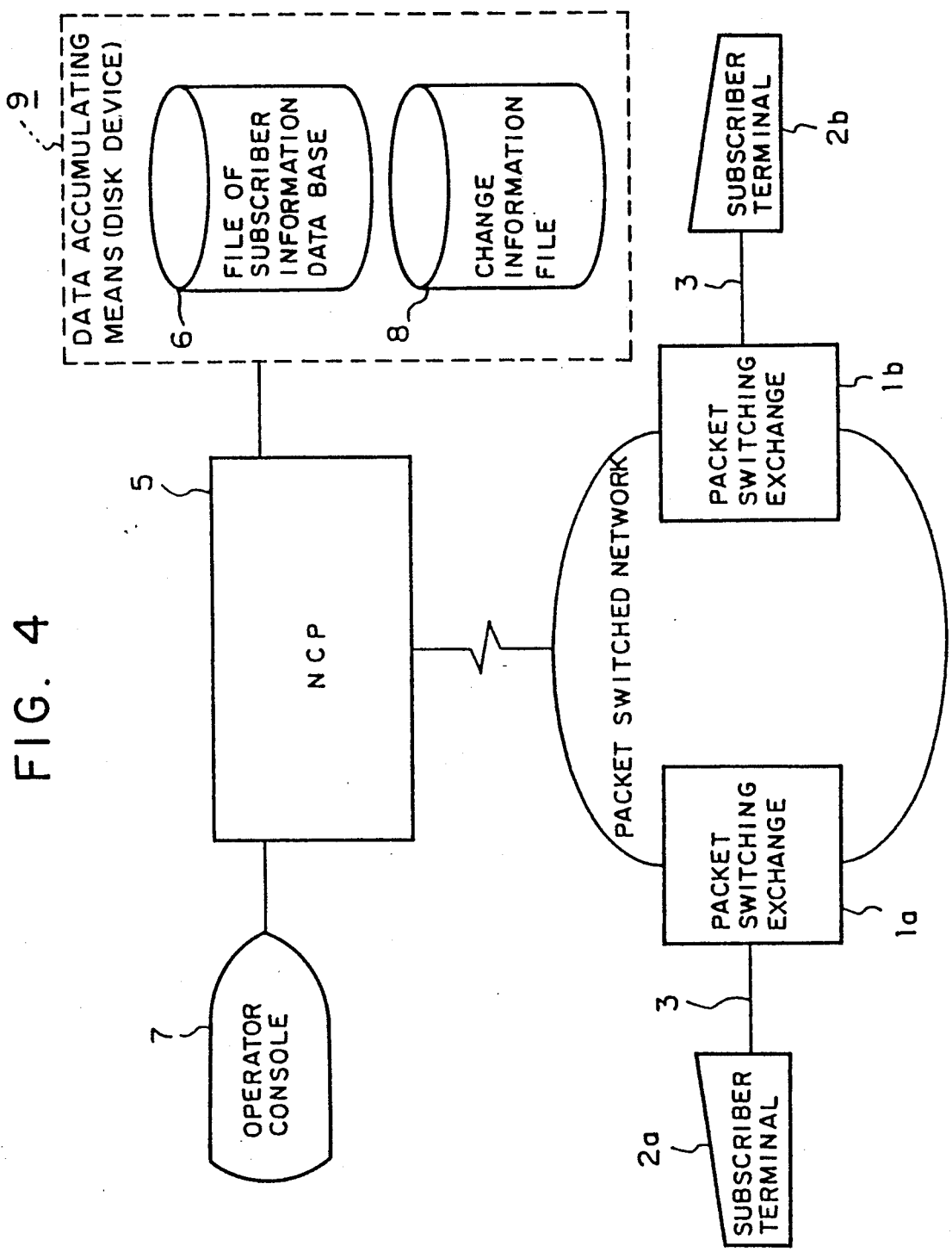
FIG. 4 is a block diagram showing a maintenance system for operation management data in a packet switched network according to an embodiment of the present invention.

In FIG. 4, 1a and 1b are packet switching exchanges; 2a and 2b are subscriber terminals; 3 is a terminal line; 5 is an NCP; 6 is a subscriber information data base file; 7 is an operator console. These component parts are similar or equivalent to those denoted by the same numbers in FIG. 2, so that detailed explanations are omitted. The component part 8 is a change information file created on the basis of subscriber terminal management data inputted from the operator console 7; 9 is a disc device as a data accumulating means including the change information file 8 and the subscriber information data base file 6, and the disc device 9 is connected to the NCP 5. The table configurations of subscriber information in the packet switching exchanges 1a and 1b are constituted similarly to that of a conventional type as shown in FIG. 3.

The operation will be explained in the following FIGS. 5 (a) to (d) are time charts for explaining control operation for the change of the subscriber terminal management data.

Figure 5:
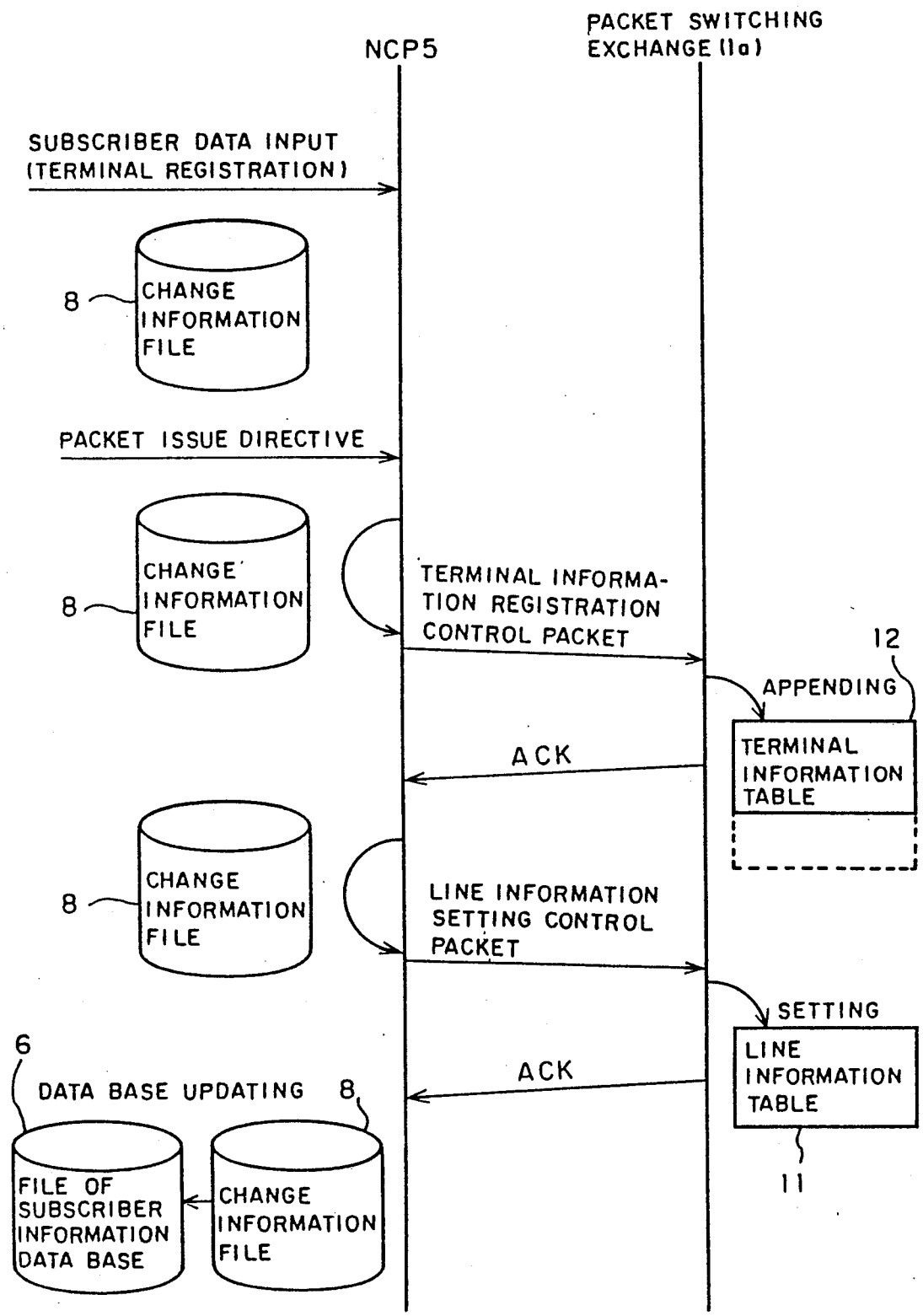
FIGS. 5 (a) to (d) are time charts for the explanation of the control operation of the above-mentioned maintenance system.
Figure 5:
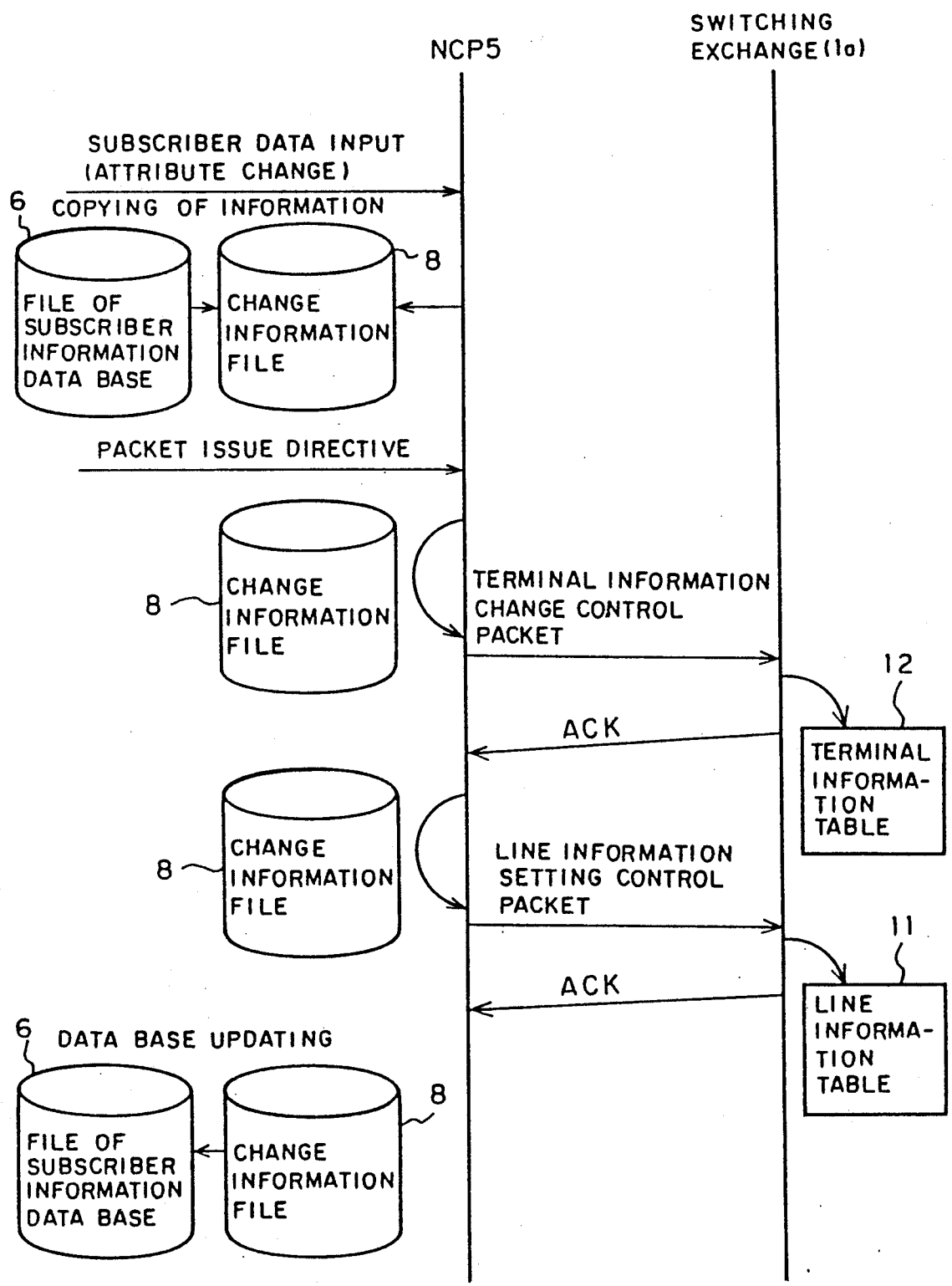
Figure 5:
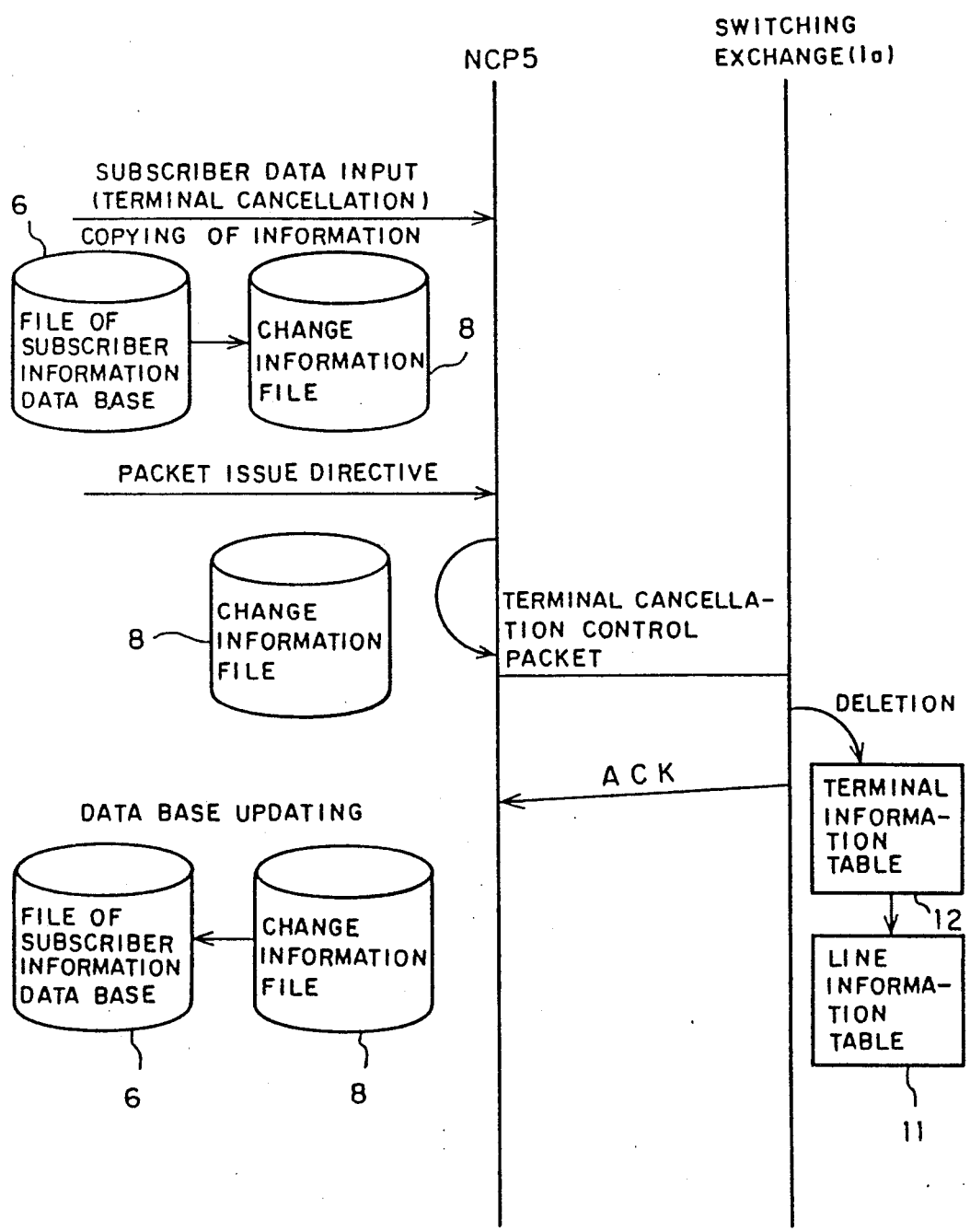
Figure 5:
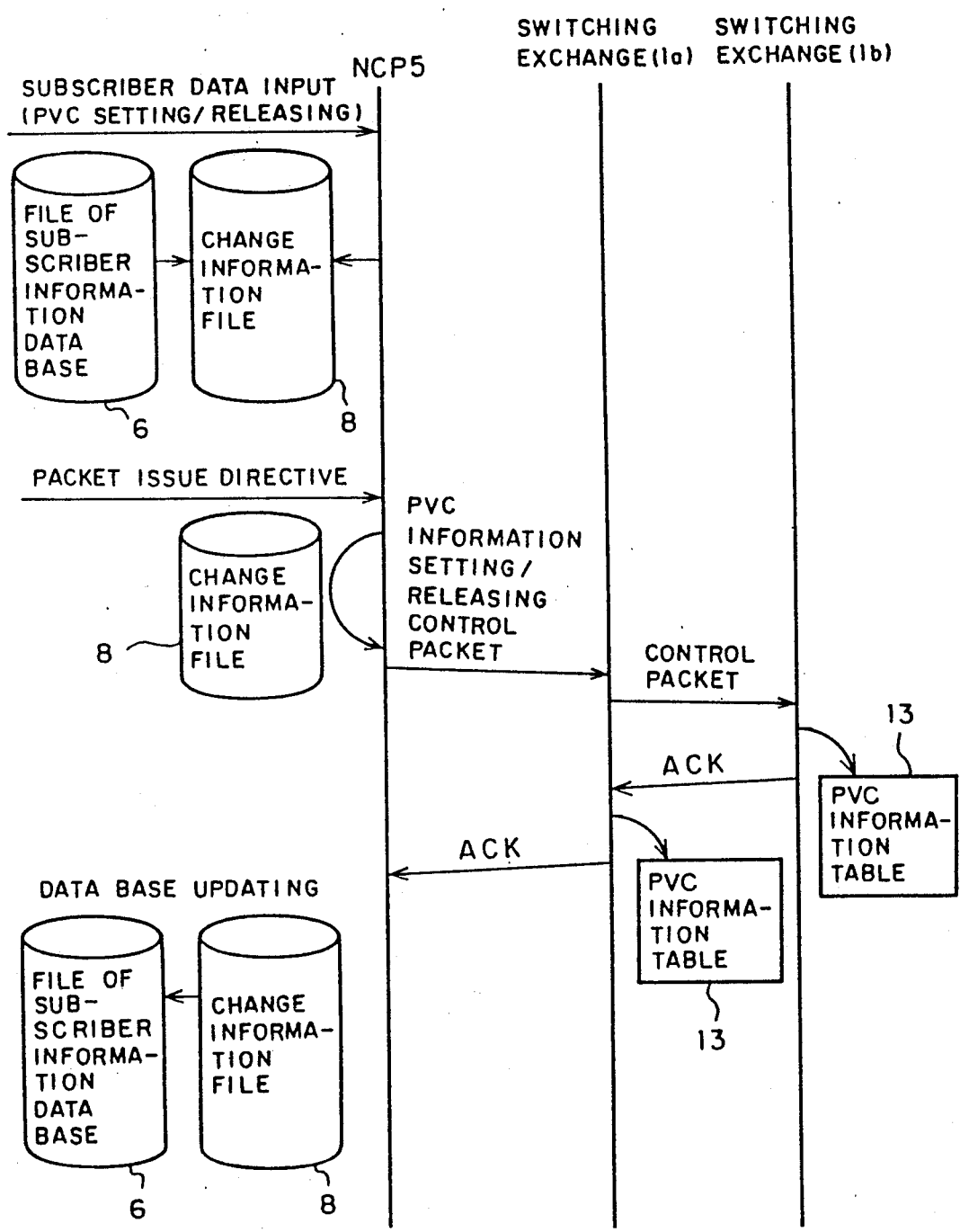

An explanation of the case where a subscriber terminal 2a is to be newly registered with a packet switching exchange in a packet switched network shown in FIG. 4 is given referring to FIG. 5 (a).

In a first step, the subscriber data of a subscriber terminal 2a to be newly registered are inputted from the operator console 7. The NCP 5 creates a change information file 8 in the disc device 9 based on the inputted data. In a second step, when a change control packet issue directive for a packet switched network is inputted from the operator console 7, the NCP 5 issues a registration control packet of terminal information based on the contents of the change information file 8 for the packet switching exchange 1a. At the packet switching exchange 1a which has received a registration control packet of terminal information, additional registration of terminal information of the subscriber terminal 2a is made in the terminal information table 12. At this time, it is arranged that the terminal information concerning other subscriber terminals is kept as it is and there is no influence on the communication processes of other subscriber terminals which have no relation to the addition of the relevant terminal information. Such an arrangement as mentioned above can be realized by a multitask program configuration in which, for example, a task for a communication process and a task for appending terminal information to the terminal information table 12 are executed asynchronously. When terminal information is appended to the terminal information table 12, the packet switching exchange 1a returns an acknowledgment signal (hereinafter referred to as ACK) to the NCP 5. On receiving the ACK, the NCP 5 issues a control packet for line information setting to the packet switching exchange 1a based on the contents of the change information file 8 which has been created previously. The packet switching exchange 1a, for line information setting control, sends back an ACK to the NCP 5 after setting the line information of the relevant subscriber terminal 2a line information table 11. At this time, in the similarly to the above, this operation does not affect the communication processes in other subscriber terminals. In a third step, when the NCP 5 confirms that two ACK's returned from the packet switching exchange 1a are both normal responses, the subscriber information data base file 6 is updated based on the contents of the change information file 8.

The explanation of the case where an attribute of the subscriber terminal 2a in the packet switching exchange 1a is now to be changed, is given referring to FIG. 5 (b). In a first step, the attribute change subscriber data for an existing subscriber terminal 2a is inputted from the operator console 7 of the NCP 5. At this time, the NCP 5 creates a change information file 8 in the disc device 9, and the information of the existing subscriber terminal 2a is copied from the subscriber information data base file 6 to the change information file 8 beforehand and the change data are inputted to the file 8. In a second step, when an issue directive of a change control packet is inputted from the operator console 7, NCP 5 issues a change control packet for the terminal information based on the contents of the change information file 8 to the packet switching exchange 1a. The packet switching exchange 1a, which has received a change control packet for the terminal information, changes the relevant subscriber terminal information in the terminal information table 12. At this time, similarly to the above, this operation does not affect the communication processes of other subscriber terminals. After that, the packet switching exchange 1a returns an ACK to the NCP 5, and on receiving the ACK the NCP 5 issues a control packet for line information setting based on the contents of the change information file 8. When the packet switching exchange 1a receives the control packet, it sets the I/F information of the relevant line in the line information table 11 in a manner so as not to affect the communication processes of other subscriber terminals, and then it returns an ACK to the NCP 5. In a third step, when the NCP 5 confirms that two returned ACK's are both normal responses, the subscriber information data base file 6 is updated based on the contents of the change information file 8.

Explanation will now be given for the case where a subscriber terminal 2a in a packet switching exchange 1a is to be cancelled referring to FIG. 5 (c). In a first step, the subscriber data designating a subscriber terminal 2a to be cancelled is inputted from the operator console 7. With these data the NCP 5 creates a change information file 8 in the disc device 9, and copies the existing subscriber terminal information from the subscriber information data base file 6 to the change information file 8. In a second step, when an issue directive of a change control packet is inputted from the operator console 7, the NCP 5 issues a terminal cancellation control packet based on the contents of the change information file 8 to the packet switching exchange 1a. On receiving the terminal cancellation control packet, the packet switching exchange 1a deletes the information concerning a relevant subscriber terminal 2a in the terminal information table 12 and the information concerning a relevant line in the line information table 11, and returns an ACK to the NCP 5. At this time, similarly to the above, this operation does not affect the communication processes of other subscriber terminals. In a third step, on receiving the ACK, the NCP 5 confirms that it is a normal response; the NCP 5 deletes the information concerning the subscriber terminal 2a to be cancelled from the subscriber information data base file 6 based on the contents of the change information file 8.

The explanation of setting/releasing PVC information between the subscriber terminal 2a of the packet switching exchange 1a and the subscriber terminal 2b of the packet switching exchange 1b is now given referring to FIG. 5 (d). In a first step, when the subscriber data designating setting/releasing of PVC information is inputted from the operator console 7, the change information file 8 is created in the disc device 9 based on the contents of the subscriber information data base file 6. In a second step, when an issue directive of a change control packet is input from the operator console 7, the NCP 5 issues a PVC information setting/releasing packet based on the contents of the change information file 8 to a packet switching exchange for which a subscriber terminal on a side of PVC communication is subscribing (in this example, the packet switching exchange 1a for which the subscriber terminal 2a is subscribing). On receiving the PVC information setting/releasing packet, the packet switching exchange 1a issues a packet switching exchange control packet for a packet switching exchange for which a subscriber terminal on another side of PVC communication is subscribing based on the contents of the received packet from NCP 5 (in this example the packet switching exchange 1b for which the subscriber terminal 2b is subscribing). The packet switching exchange 1b updates its own PVC information table 13 based on the contents of the control packet from exchange 1a, and returns an ACK to the packet switching exchange 1a. The packet switching exchange 1a, after confirming the ACK to be a normal response, updates its own PVC information table 13 and returns an ACK to the NCP 5. At this time, the updating of PVC information tables 13 of both of the packet switching exchanges 1a and 1b is performed not to affect other PVC communications similarly as in the above. In a third step, on receiving the ACK, the NCP 5 confirms that the ACK is a normal response and then updates the subscriber information data base file 6, based on the contents of the change information 8.

In the above embodiment, the control operation for changing the subscriber terminal management data concerning one subscriber terminal is explained, and when there are a plurality of subscriber terminals, the above-mentioned operation shall be performed repeatedly. In the above embodiment, the explanation is given for setting/releasing of PVC information between subscriber terminals subscribing to two different packet switching exchanges, but the same can be said for setting/releasing of PVC information between the subscriber terminals subscribing to one packet switching exchange.

According to the present invention, the following advantages can be expected: an NCP is provided as one of the nodes in a packet switched network, and a packet for change control is issued in conformity with the contents of a change information, file based on the subscriber data which are changed with new registrations, changes of attributes or cancelation of a subscriber terminal, and the changes of subscriber terminal management data on each of the packet switching exchanges are performed under remote controlling; the file in the subscriber information data base is updated after confirming an ACK, which is returned from a packet switching exchange, to be a normal response, so that the data base of subscriber terminal management data is unitarily managed by an NCP; it eliminates local data updating in each of the packet switching exchanges and moreover multitask processes on each of the packet switching exchanges are made possible; it is therefore made possible to perform information updating of subscriber terminal management data without affecting the communication processes of other subscriber terminals.

What is claimed is:

1. A maintenance system for subscriber terminal management data in a packet switched network including a plurality of packet switching exchanges performing change of subscriber terminal management data following new registrations, changes of attributes, and registration cancellations of subscriber terminals associated with particular packet switching exchanges, comprising:
    an operator console for inputting data to the packet switched network,
    a data accumulating means having a subscriber data base file and a change information file, and
    a network controlling processor for managing the whole of said packet switched network,
    said system comprising the steps of:
        creating a change information file in said data accumulating means based on updated subscriber data of a subscriber terminal inputted from said operator console,
        changing subscriber terminal management data stored in the packet switching exchange associated with said subscriber terminal by issuing a change control packet to said packet switching exchange based on the contents of said change information file, and
        updating the subscriber information data base file in said data accumulating means based on the contents of said change information file upon confirming a normal response indicating a completed operation returned from said packet switching exchange for said packet.

2. A maintenance system according to claim 1, wherein said step of changing the subscriber terminal management data is performed by a multitask process which enables a communication processing task and a change processing task to be executed asynchronously.

* * * * *

UNITED STATES PATENT AND TRADEMARK OFFICE
CERTIFICATE OF CORRECTION

PATENT NO. : 5,029,161

DATED : July 2, 1991

INVENTOR(S) : Yoshiaki Nagashima

It is certified that error appears in the above-identified patent and that said Letters Patent is hereby corrected as shown below:

```
Column 2, line 18, delete "the";
         line 51, "is" should be --in--;
         line 52, delete "the".

Column 5, line 32, after "2a" insert --in the--;
         line 33, delete "in the";
         line 42, after "is" (first occurrence) delete "now" and
                  after "is" (second occurrence) insert --now--.

Column 8, line 5, delete "change" and insert therefor --changes--.
```

Signed and Sealed this

Ninth Day of March, 1993

*Attest:*

STEPHEN G. KUNIN

*Attesting Officer*         *Acting Commissioner of Patents and Trademarks*